Sept. 15, 1936.  P. A. KINZIE  2,054,258
VALVE
Original Filed May 7, 1932  3 Sheets-Sheet 2
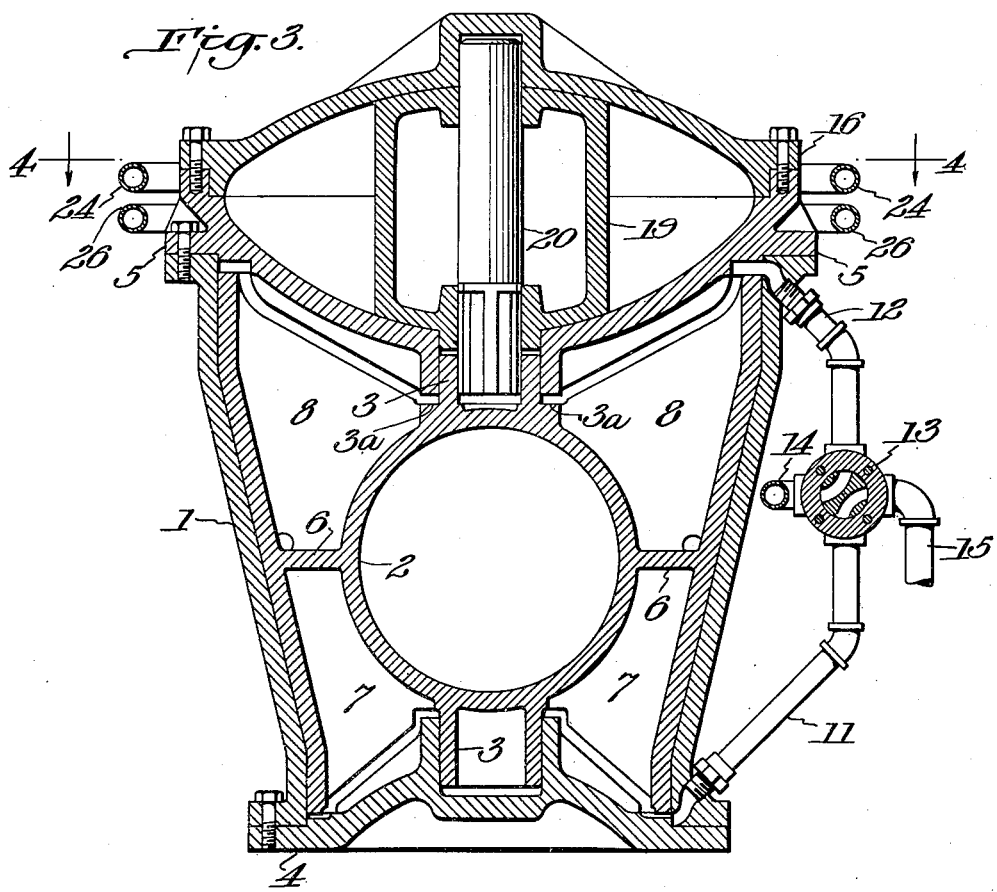
Inventor:
Phillip A. Kinzie,
By Byrnes Townsend & Potter,
Attorneys.

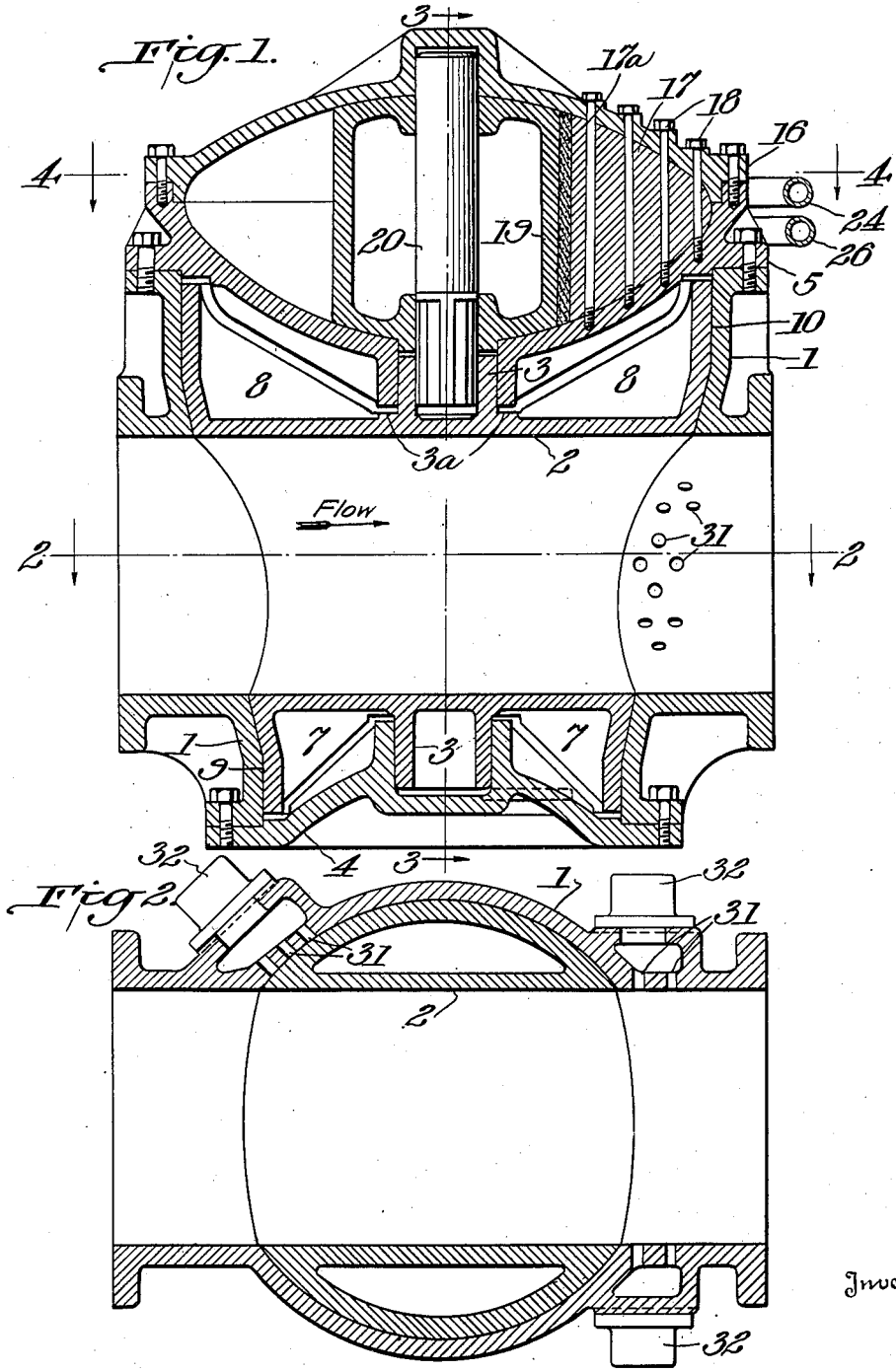

Sept. 15, 1936.   P. A. KINZIE   2,054,258
VALVE
Original Filed May 7, 1932    3 Sheets—Sheet 3
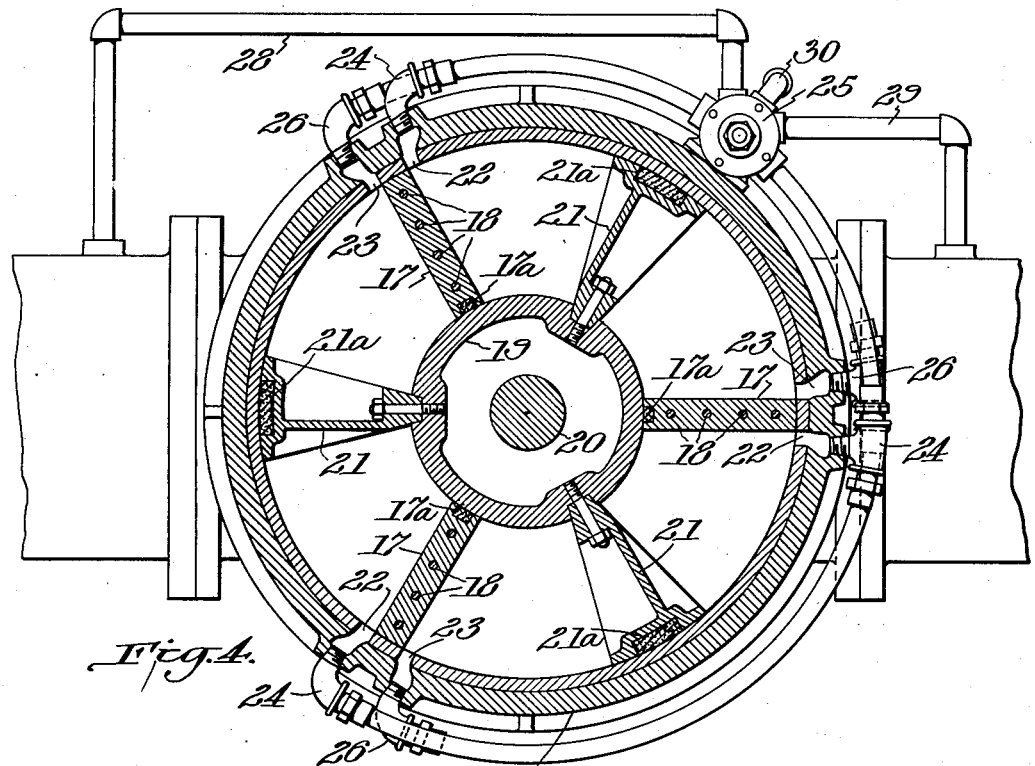
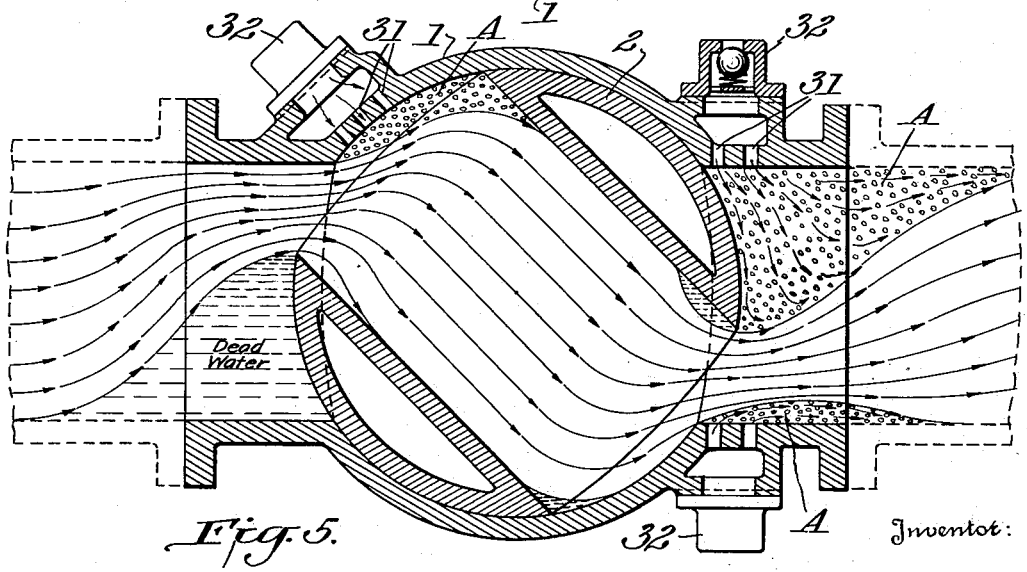

Patented Sept. 15, 1936

2,054,258

UNITED STATES PATENT OFFICE 2,054,258

VALVE

Phillip A. Kinzie, Denver, Colo., assignor to Universal Hydraulic Corporation, Denver, Colo., a corporation of Colorado Application May 7, 1932, Serial No. 609,904
Renewed January 14, 1936

14 Claims. (Cl. 137—139)

This invention relates to valves of the rotary plug type, and more particularly to valves that are of such size and/or that control the flow of fluid under such pressures that it would be difficult or impractical to turn the valves manually.

Rotary plug valves have been known for centuries and, in general, comprise a casing or shell having intersecting passages therethrough, one passage being a fluid conduit and the other passage, of cylindrical or of slightly tapered form, being adapted to receive a similarly shaped plug that has a transverse opening therethrough. In one position of the plug, the fluid conduit or passageway through the shell is interrupted by the solid portions of the plug and, when the plug is given a quarter turn, the plug opening registers with and forms a part of the fluid passageway through the shell. The tapered or conical plug is usually spring-pressed on its seat and, to permit easy turning of the plug, it may be moved axially to free it from wedging engagement with its seat.

According to the present invention, the field of utility of the plug type of valve may be extended to the control of large quantities of water, as in the mains of a municipal water system, to high pressure steam lines and oil refinery service where the sizes required are much less than in a water supply system, but the pressures are, or may be, considerably in excess of the water pressures, and, in general, to installations in which it would be impractical to rotate plug valves by hand.

An object of the invention is to provide plug valves of an improved design that is suitable for large size valves and/or for valves controlling the flow of fluids under heavy pressures. An object of the invention is to provide a plug valve which includes fluid-pressure apparatus for controlling the setting of the valve. An object is to provide a plug valve that, even in large sizes and/or when controlling high pressure fluids, is capable of extremely rapid opening or closing movements, or of partial cycles of such movements. A further object is to provide a plug valve for controlling fluid flow and which includes elements for moving to and for locking the valve in full open, full closed or in a desired intermediate position in response to the relative pressures at points in the fluid conduit in which the valve is located; the control thus effected being similar to that of the control systems commonly employed with large size needle valves.

More specifically, an object of the invention is to provide a valve of the tapered rotatable plug type which is adapted to the control of the flow of large quantities of water under high pressures and velocities, positively, safely and economically, and which may be actuated by the potential power of the controlled water stream or by a separate source of pressure fluid, thus enabling the valve to be operated when the controlled conduit is drained. A further specific object is to provide a plug valve or water conduit in which air is automatically supplied to the valve or associated conduit to reduce the erosion that normally takes place when the water flow is at such high velocities as to produce vacuum pockets at regions where there are sharp changes in the contour or outline of the water passage.

These and other objects and advantages of the invention will be apparent from the following specification when taken with the accompanying drawings, in which:

Fig. 1 is a vertical sectional elevation of one embodiment of the invention, taken substantially upon the longitudinal center line of the valve;

Fig. 2 is a horizontal sectional view taken substantially upon the line 2—2 of Fig. 1;

Fig. 3 is a vertical sectional view as taken on line 3—3 of Fig. 1;

Fig. 4 is a horizontal section showing the hydraulic motor as viewed on line 4—4 of Fig. 1, but showing the hydraulic motor in a position corresponding to partial opening of the plug valve, and Fig. 5 is a horizontal sectional view similar to Fig. 2, but showing the valve in partially closed position.

Before proceeding to a detailed description of this embodiment of the invention, particular attention is directed to the fact that, while not restricted thereto, the novel constructions are particularly adapted to large size installations in which the rotatable plug may weigh many thousands of pounds. In such installations, the several elements of the valve may be constructed in sections which are bolted or otherwise secured to each other but, for simplicity and clearness, such sectional constructions are not illustrated as the detailed construction of the elements may be varied to suit special requirements and does not constitute an essential feature of this invention.

The several views are therefore to be understood as being somewhat diagrammatic illustrations which, while fully illustrative of the invention, are not intended to be considered to be detail or shop drawings for the construction of valves of extremely large sizes.

As indicative of the contemplated larger size units, certain applications of the novel valve constructions will be specified. The valve is adapted for use as a throttling stop valve in a city water main and, with appropriate connections from the main to the operating motor, as a check valve in a city water main; as a shut-off valve in a penstock adjacent a turbine, as a synchronous relief valve for a turbine; as a free discharge regulating valve at the outlet end of a conduit leading through a dam and/or for the control of other water or fluid flow in large quantities and under heavy pressures.

In the drawings, the reference numeral 1 identifies the main shell or valve casing which has an axial cylindrical bore constituting the fluid passageway and a transverse, intersecting bore of tapered form in which the valve plug 2 is positioned, the plug 2 having a fluid passageway therethrough which, as shown in Figs. 1 and 2, registers with the cylindrical bore of the shell 1 to form a continuous cylindrical passageway through the shell. Hubs or journals 3 are provided on the plug or valve element 2 which are mounted in the cylindrical bearing surfaces of a domed or dished head 4 which is bolted to the shell 1 to close one of the passages or bores in which the plug is mounted, and in a second domed head 5 which, as will be described hereinafter, forms one wall of the chamber of the fluid motor that is provided for actuating the valve.

As best shown in Fig. 3, the plug 2 is not solid but comprises an inner cylindrical wall which provides the fluid passageway and the outer wall of generally tapered form, these walls merging into each other at the boundaries of the plug and being connected by central transverse webs 6 which provide sector shaped chambers 7, 8 at each side of the plug. The end portions of the plug and its mating seat or shell 1 are not tapered, but are cylindrical as indicated at 9, 10, respectively on Fig. 1. The plug is thereby guided for axial reciprocation by the cylindrical surfaces and, in the larger sizes, this axial movement may be of the order of one-half inch, the lower limit of movement being determined by the wedging engagement of the tapered intermediate portion of the plug 2 on its correspondingly tapered seat and the upper limit being set by engagement of the radial shoulder 3ª, at the base of the upper hub 3, with the bearing in which that hub is rotatably mounted.

It will be noted that the heads 4, 5 cooperate with the transverse webs 6 and the walls of the plug 2 to define the chambers 7, 8 to which pressure fluid may be admitted to move the plug 2 axially. Conduits 11, 12, lead from a four-way control valve 13 to the shell 1 to communicate with chambers 7, 8, respectively; the valve 13 having a pressure fluid inlet pipe 14 that may lead to the fluid conduit above the valve shell 1 or to a separate pressure fluid source, and a drain pipe 15. As illustrated, the valve 13 is positioned to deliver pressure fluid from pipe 14 to the chamber 8 and to drain chamber 7.

Under these conditions, the plug 2 is wedged tightly against its conical seat and is securely locked against rotation. When valve 13 is turned through 90°, the chamber 8 is drained and pressure fluid is supplied to chamber 7 to raise the plug valve 2 from its conical seat, thus permitting rotation of the plug valve.

The operating chamber of the fluid pressure motor for controlling the position of the valve element 2 is provided by an upper head 16 which is bolted to the upper flange of the domed head 5. The head 16 is preferably domed, thus providing a chamber having arched walls that are well adapted to resist distortion under heavy pressures, thus preventing leakage around the edges of the blades of the rotary motor. The space between the boundary walls 5 and 16 is divided into a plurality of chambers, preferably three, by rigid radial diaphragms or partitions 17 that are secured in place by bolts 18 that pass through the upper wall 16 and the partitions, and are threaded into the head 5. A tubular member 19 has upper and lower curved surfaces which fit accurately against the heads 5 and 16, and is provided with an upper hub for receiving a vertical shaft 20 that, at its lower end, is splined to fit a correspondingly broached lower hub of the tubular member 19 and to have a sliding fit within splines on the inner surface of the tubular upper hub 3 of the valve element 2. Axial movement of the valve 2 with respect to the tubular element 19 is thus permitted, but these parts are locked against relative angular movement.

Impeller fins 21 are rigidly attached to the tubular member 19 and, at their outer edges, are provided with suitable packing 21ª, to prevent leakage of pressure fluid around the edge of the fins. The inner edges of the radial partitions 17 are provided with recesses for receiving packing 17ª for preventing leakage between the contacting surfaces of the element 19 and the partitions.

The lenticular space or cavity between the domed heads 5 and 16 is thus divided into six pressure chambers which are substantially sealed against leakage between the chambers. Ports 22, 23 are provided in the walls of the motor chamber adjacent the opposite edges of the several fixed diaphragms 17, the ports 22 communicating through conduits 24 with a control valve 25, and the ports 23 communicating with the control valve through conduits 26. A pressure fluid may be supplied to valve 25 from an independent source or, as is customary with needle valve control systems, from conduits 28, 29 that extend, respectively, to the controlled fluid conduit at opposite sides of the plug valve. A drain pipe 30 leads from the control valve 25 and, as will be apparent from a consideration of the known needle valve control systems, the valve 25 may be so positioned as to close the plug valve 2, to open the plug valve 2, or to maintain the valve at any desired intermediate position.

To reduce erosion of the valve and the associated conduit, means is provided for admitting air to regions which, in intermediate positions of the valve element 2, would be subjected to a high vacuum when the water flows under high velocity. When water flows at velocities of the order of 40 feet per second, the contact of the water with the conduit walls is lost when projections are introduced into the conduit.

The path of the water flow when the valve is partly open is indicated in Fig. 5 and it will be noted that there are regions A in which relatively high vacuums are produced. In such regions, the metallic surfaces of the valve and conduit are subjected to rapid erosion and, in equipment of the larger sizes such as is used in irrigation, power and municipal systems, the rapid destruction requires frequent shut-downs and costly repairs hurriedly made under adverse conditions. According to one theory, this rapid erosion arises from the liberation of oxygen at the low pressure regions but, whatever the true explanation may be, I have found that the erosion may be reduced by introducing air into the low pressure regions to break the vacuum which normally results from the high velocity of the water.

As shown in Figs. 2 and 5, the valve shell 1 is cored to provide passages which communicate with the low pressure regions A through ports 31 and to which air flows from automatic check valves 32.

In the operation of the valve, the auxiliary valve 13 is first operated to admit pressure to chamber 7 to release the wedging engagement of the tapered element 2 with its seat, and the control valve 25 is then positioned to admit pressure fluid to the appropriate series of pressure chambers to rotate the valve. When the valve has assumed its new position, the valve 13 is turned to introduce pressure fluid into chambers 8 to force the valve 2 downward into locking engagement with its tapered seat.

As stated above, the invention is not restricted to any particular size of valve but provides plug valves that are adapted for use under any conditions in which a direct manual adjustment of the valve is either impractical or impossible. It will therefore be understood that the invention is not restricted to the specific embodiment herein illustrated and described, and that changes may be made in the several elements, their relative size, shape and relationship without departure from the spirit of my invention as set forth in the following claims.

I claim:

1. In a valve, a casing having a fluid conduit therethrough and a valve seat bore extending transversely across said conduit, the wall of said bore having cylindrical end sections joined by a tapered section, plates closing the ends of said valve seat bore, a tapered plug seated in said bore and having cylindrical end sections mating with and slidable upon the cylindrical wall sections of said bore, cooperating journal means on said plates and plug mounting said plug for axial movement and for rotation within said casing, and means for introducing pressure fluid between said plates and the adjacent ends of said plug for moving said plug axially to free the tapered section of said plug from or to wedge the same upon the tapered section of said bore; said plug comprising a hollow outer wall, a transverse cylindrical wall, and webs extending between said walls to divide the space between said walls into two chambers.

2. In a valve, a casing having a bore with cylindrical end portions joined by a tapered section, a valve plug seated in said bore and having corresponding tapered and cylindrical portions, domed end plates mounted on said casing with their convex faces toward said valve plug and closing off said bore, cooperating hubs and bearings on said valve plug and said plates, said hubs and bearings permitting axial movement and rotary movement of said valve plug, means for moving said valve plug axially to free the tapered portion thereof from wedging engagement with its seat, and a fluid pressure motor for actuating said valve plug, said motor comprising a domed plate cooperating with one of said end plates to provide a motor chamber, radial partitions in said motor chamber, a shaft rotatably mounted in said motor chamber, means connecting said shaft and valve plug for relative axial movement and locking the same against relative rotary movement, impeller fins secured to said shaft and cooperating with said partitions to divide said motor chamber into a plurality of pressure chambers, and means for introducing pressure fluid into said pressure chambers to rotate said valve plug.

3. In a valve, a casing having a bore therethrough, a plug valve seated in the bore of said casing, inwardly domed end plates secured to said casing to close the ends of said bore, an outwardly domed plate secured to one of said end plates and cooperating therewith to define a motor chamber of elliptical shape in axial section, a hub journalled in said chamber, impeller fins secured to said hub, radial partitions secured to the domed walls of said chamber, and means for introducing pressure fluid into said chamber at the opposite sides of each of said radial partitions.

4. A valve as claimed in claim 3, wherein said hub is hollow, in combination with a shaft extending through and fixed to said hub, said shaft being splined to said plug.

5. In a valve for the control of a high velocity water stream, a casing having walls defining a water passage therethrough and a transverse bore intersecting said passage, a valve plug rotatable in said bore and having a passage therethrough which alines with the water passage of said casing in the fully open position of said valve, air inlet ports extending through the wall of said casing at a region thereof adjacent to and at the outlet side of said transverse bore, and check valve means for admitting air to said ports.

6. In a valve for the control of a high velocity water stream, a casing having walls defining a water passage therethrough and a transverse bore intersecting said passage, a valve plug rotatable in said bore and having a passage therethrough which alines with the water passage of said casing in the fully open position of said valve, air inlet ports extending through the casing wall at a portion defining said transverse bore, the said wall portion being towards the inlet side of said casing and uncovered by said valve plug when the same is in partially opened position, and check valve means for admitting air to said ports.

7. In combination with a conduit accommodating high velocity liquid flow, adjustable liquid flow control means movable in said conduit to positions intermediate the extremes of full flow and no flow whereby the stream cross section is altered from that of full flow with resultant regions of reduced fluid pressure adjacent the liquid path, and fluid actuated means operative to introduce fluid into said reduced fluid pressure regions only upon the occurrence of such reduced pressure therein.

8. In combination with a conduit accommodating high velocity liquid flow, adjustable liquid flow controlling means movable in said conduit to positions intermediate the extremes of full flow and no flow with resultant regions of reduced fluid pressure adjacent the liquid path, and means operative to introduce fluid into said reduced fluid pressure regions only upon the occurrence of such reduced pressure therein.

9. In combination with a conduit accommodating high velocity liquid flow, liquid flow controlling means adjustable transversely of said conduit to full flow and no flow positions and to positions intermediate the full flow and no flow positions, such adjustment to intermediate positions resulting in regions of reduced fluid pressure adjacent the liquid path incident to the transverse arrangement of said controlling means, and means for introducing fluid into said reduced fluid pressure regions upon the occurrence or subatmospheric pressures therein.

10. In a valve for the control of a high velocity water stream, the combination with a casing having a fluid conduit therethrough and a rotary plug valve therein and intersecting said conduit, rotation of said plug valve to positions intermediate its fully opened and fully closed positions acting to produce in said conduit adjacent to said plug valve regions of low pressure, of means for increasing and thus modifying the pressure in such low pressure regions.

11. In a valve for the control of a high velocity water stream, the combination with a casing having a fluid conduit therethrough and a rotary plug valve therein and intersecting said conduit rotation of said plug valve to positions intermediate its fully opened and fully closed positions tending to establish in said conduit regions of low pressure, of means for admitting fluid to such regions to increase and thus modify the pressure in such regions.

12. In combination with a conduit accommodating a high velocity water stream, a valve provided with a casing having a fluid passage therethrough, said valve adjustable in said passage to positions intermediate its fully opened and fully closed positions and tending to thus establish in said passage regions of low pressure, of ports in said casing and communicating with said low pressure regions, and check valves for admitting fluid to said ports and therethrough to said regions.

13. A valve comprising a casing having a throughway, a valving element associated therewith and formed of intersecting continuously curved wall portions lying one within the other to provide a hollow body with a passage therethrough cooperative with said throughway, means extending between the outer side of one wall and the inner side of another to form with the curved walls a diaphragm providing oppositely disposed pressure chambers each closed at one side by the casing, means for moving the valving element to register the passage and throughway, and means for moving the valving element through a differential in pressure in the oppositely disposed chambers.

14. A valve comprising a casing having a throughway, a valving element associated therewith and formed of intersecting hollow bodies lying one within the other to provide a passage therethrough cooperative with said throughway, means extending between the outer side of one wall and the inner side of another wall of said hollow bodies to form with the said walls a diaphragm providing oppositely disposed pressure chambers each closed at one side by the casing, means for moving the valving element to register the passage and throughway, and means for moving the valving element through a differential in pressure in the oppositely disposed chambers.

PHILLIP A. KINZIE.